(12) United States Patent
Bader

(10) Patent No.: US 7,288,731 B2
(45) Date of Patent: Oct. 30, 2007

(54) SWITCHING DEVICE

(75) Inventor: Josef Bader, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 365 days.

(21) Appl. No.: 10/531,342

(22) PCT Filed: Oct. 16, 2003

(86) PCT No.: PCT/EP03/11453

§ 371 (c)(1),
(2), (4) Date: Apr. 15, 2005

(87) PCT Pub. No.: WO2004/038262

PCT Pub. Date: May 6, 2004

(65) Prior Publication Data

US 2006/0162478 A1    Jul. 27, 2006

(30) Foreign Application Priority Data

Oct. 22, 2002   (DE)   ................ 102 49 048

(51) Int. Cl.
*H01H 9/54* (2006.01)

(52) U.S. Cl. ............. 200/1 R; 200/549; 200/557; 200/252; 338/118

(58) Field of Classification Search ............ 200/1 R, 200/16 R, 16 A, 549–550, 557, 252, 260, 200/275; 338/118, 128, 160
See application file for complete search history.

(56) References Cited

U.S. PATENT DOCUMENTS

| 1,887,943 | A |   | 11/1932 | Padgett et al. |
| 2,582,895 | A |   | 1/1952  | Young |
| 4,088,852 | A | * | 5/1978  | Van Doren ............... 200/1 R |
| 4,249,056 | A | * | 2/1981  | MacManus .............. 200/1 B |
| 4,357,502 | A | * | 11/1982 | Beck ...................... 200/1 V |
| 5,644,114 | A | * | 7/1997  | Neaves .................... 200/6 R |
| 5,960,939 | A | * | 10/1999 | Miki et al. .............. 200/257 |

FOREIGN PATENT DOCUMENTS

| DE | 1 013 972    | 1/1958  |
| DE | 1 027 529    | 4/1958  |
| DE | 1 198 213    | 8/1965  |
| DE | 44 22 900 A1 | 11/1994 |
| DE | 199 57 750 A1| 6/2001  |
| EP | 0 541 035 A1 | 5/1993  |
| EP | 0 595 496 A2 | 5/1994  |
| EP | 0 541 035 B1 | 4/1998  |
| GB | 1045972      | 10/1966 |

* cited by examiner

Primary Examiner—K. Richard Lee
(74) Attorney, Agent, or Firm—Davis Bujold & Daniels, P.L.L.C.

(57) ABSTRACT

A switching device (2) for a multi-step vehicle transmission (4) having one main transmission part (6) and an auxiliary-section transmission part (10) comprising the switching mechanisms (12, 14, 18, 38) for actuating switching elements (44, 50, 52, 54) in the main transmission part (6) and switching mechanisms (12, 14, 18, 38) for actuating switching elements (42, 46) in the auxiliary-section transmission part (10). The switching mechanisms (12, 14, 18, 38) for actuating the switching elements (44, 50, 52, 54) in the main transmission part (6) also actuate the switching elements (42, 46) in the auxiliary-section transmission part (10).

11 Claims, 3 Drawing Sheets

SWITCHING DEVICE

This application is a national stage completion of PCT/EP2003/011453 filed Oct. 16, 2003 which claims priority from German Application Serial No. 102 49 048.1 filed Oct. 22, 2002.

FIELD OF THE INVENTION

The invention relates to a switching device.

BACKGROUND OF THE INVENTION

Modern and multi-step vehicle transmission in industrial vehicles have a multi-step main transmission part, an auxiliary-section transmission part and/or one multi-step splitter transmission part. With a splitter transmission the gear steps of the main transmission can be further split in their ratio so that lower ratio ranges result in successive gears. With an auxiliary-section transmission the total ratio of the main transmission, can be increased by it being possible to use all gear steps of the main transmission together with each gear step of the auxiliary-section transmission and in at least one gear step of the auxiliary-section transmission, to step up or down the otherwise direct ratio of the gear steps of the main transmission.

Such a vehicle transmission has been disclosed, for example, in DE 44 22 900 A1. These vehicle transmissions are mostly manually switched in the main transmission part while the switchings in the splitter transmission part and in the auxiliary-section transmission part result by a pneumatic or hydraulic actuator after a corresponding switching has been triggered by the driver. An automated switching device for vehicle transmissions of the kind mentioned above has also been disclosed such as described in EP 0 541 035 B1. Here are combined side-by-side in a control unit actuators of which one actuator operates the splitter transmission part, the main transmission part and the auxiliary-section transmission part. Each one of said actuators engages the ratio steps via a switching rod upon the respective switching devices. Each transmission part having to be operated by a separate actuator with appertaining valves, sensors and switching rods is a disadvantage here. This involves a great multiplicity of parts and the costs and heavy weight related therewith.

The problem on which the invention is based is to show a switching device for a vehicle transmission which simplifies the actuation of the auxiliary-section transmission part.

SUMMARY OF THE INVENTION

A switching device for a multi-step vehicle transmission having one main transmission part and at least one auxiliary-section transmission part comprises switching means for actuating switching elements in the main transmission part and switching means for actuating switching elements in the auxiliary-section transmission part. According to the invention, the switching means for actuating the switching elements in the main transmission part also actuate the switching elements in the auxiliary-section transmission part. In one advantageous development, the switching means for actuating the switching elements in the main transmission part comprise a single selector shaft. In one embodiment, the switching means for actuating the switching elements in the main transmission part comprise one pneumatic, hydraulic or electric actuator for carrying out a switch command and, in one advantageous embodiment, the switching means for actuating the switching elements in the main transmission part also comprise one pneumatic, hydraulic or electric actuator for carrying out a selection command. The respective actuator is preferably controlled by automation, based on a command processed in a control device according to preset rules. In one preferred embodiment, the switching means have a clearance where one element of the switching means, such as a selector finger that actuates the switching elements, especially switching rods, is movable on the selector shaft in direction to a switching operation during a selection procedure for choosing the desired switching element. The motion of the selector finger goes here in the same direction as during a switching operation but, unlike this, represents part of a selection operation. Thereby actuators, which are to perform the actual switching motions, contribute in a certain range to the selection motion. One development shows that on the clearance, one switching element of the auxiliary-section transmission part abuts on one side and one switching element of the main transmission part on the other side. In this clearance, the selector finger changes, during its movement, e.g., from a switching rod, which serves for switching the main transmission part over to a switching rod with which the auxiliary-section transmission is switched. The switching elements are preferably synchronized switching elements. In another and also advantageous development, the switching elements comprise one dog clutch engagement without synchronizing elements. In case of one dog clutch engagement without synchronizing elements, the switching elements close to the clearance are preferably switching elements for the highest and lowest ratio steps of the main transmission part. In one advantageous embodiment, the selector finger also cannot be situated upon a selector shaft, but can be directly actuated by actuators belonging to the switching means being for the purpose directly connected therewith.

BRIEF DESCRIPTION OF THE DRAWINGS

The invention will now be described, by way of example, with reference to the accompanying drawings in which.

DETAILED DESCRIPTION OF THE INVENTION

Figure 1:
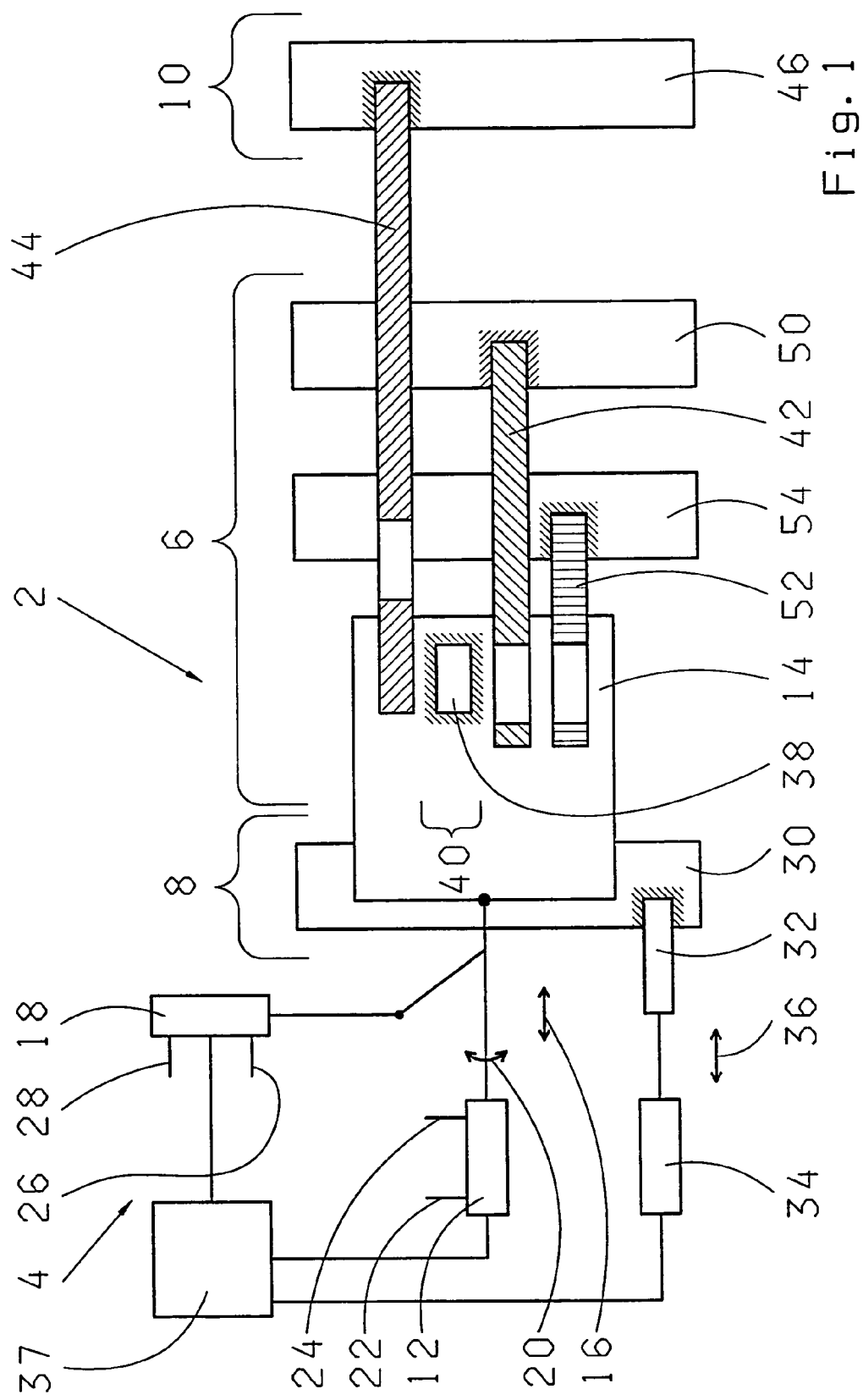
FIG. 1 is a diagrammatic view of the switching device.

FIG. 1 shows a switching device 2 of a vehicle transmission 4 with one main transmission part 6, one splitter transmission part 8 and one auxiliary-section transmission part 10. One actuator 12 operates a selector shaft 14 or a selector finger 38 axially along the arrow direction 16. By the second actuator 18, the selector shaft 14 can be swung around its axis of rotation along the arrow direction 20. With the actuators 12 and 18 are connected connecting lines 22, 24, 26 and 28 by way of which the actuators 12 and 18 are controlled. These can be electric lines, but also feedlines, for a control medium in the form of a fluid for a hydraulic or pneumatic adjustment. Here is described one pneumatic control with air, such as often exist in industrial vehicles, conditioned by the vehicle and, together with the brake control, is also used for switching the transmission. In the splitter transmission part is shown one selector fork 30 which engages in a switching element (not shown here) in the splitter transmission part 8 and divides two steps of the splitter transmission to subdivide one gear step in the main transmission part 6. The selector fork 30 is displaced by an actuator 34, via a selector rod 32, axially along the arrow direction 36 whereby the different steps of the splitter transmission part 8 can be switched. The actuators 12, 18 and 34 are connected with one control device 37 where switch signals are generated according to preset rules.

The selector shaft 14 has the selector finger 38 which in FIG. 1 is placed in a clearance 40 between a selector rod 42 and a selector rod 44. In this position, the actuator 12 can freely move the selector shaft 14 and therewith the sector finger 38 axially along the arrow direction 16 without one of the selector rods 42 or 44 being moved. A selector fork 46, which engages in a sliding sleeve (not shown here) in the auxiliary-section transmission part 10, is fixedly connected with the selector rod 44. One selector fork 50, provided for switching two gear steps in the main transmission part 6, is fixedly connected with the selector rod 42. These two gear steps constitute the first forward gear and the reverse gear of the main transmission part 6. Upon the side of the selector rod 42, opposite to the clearance 40, one other selector rod 52 is provided in which the selector finger 38 can likewise engage. The selector rod 52 is connected with a selector fork 54 which engages the second and third forward gears in the main transmission part 6.

Figure 2:
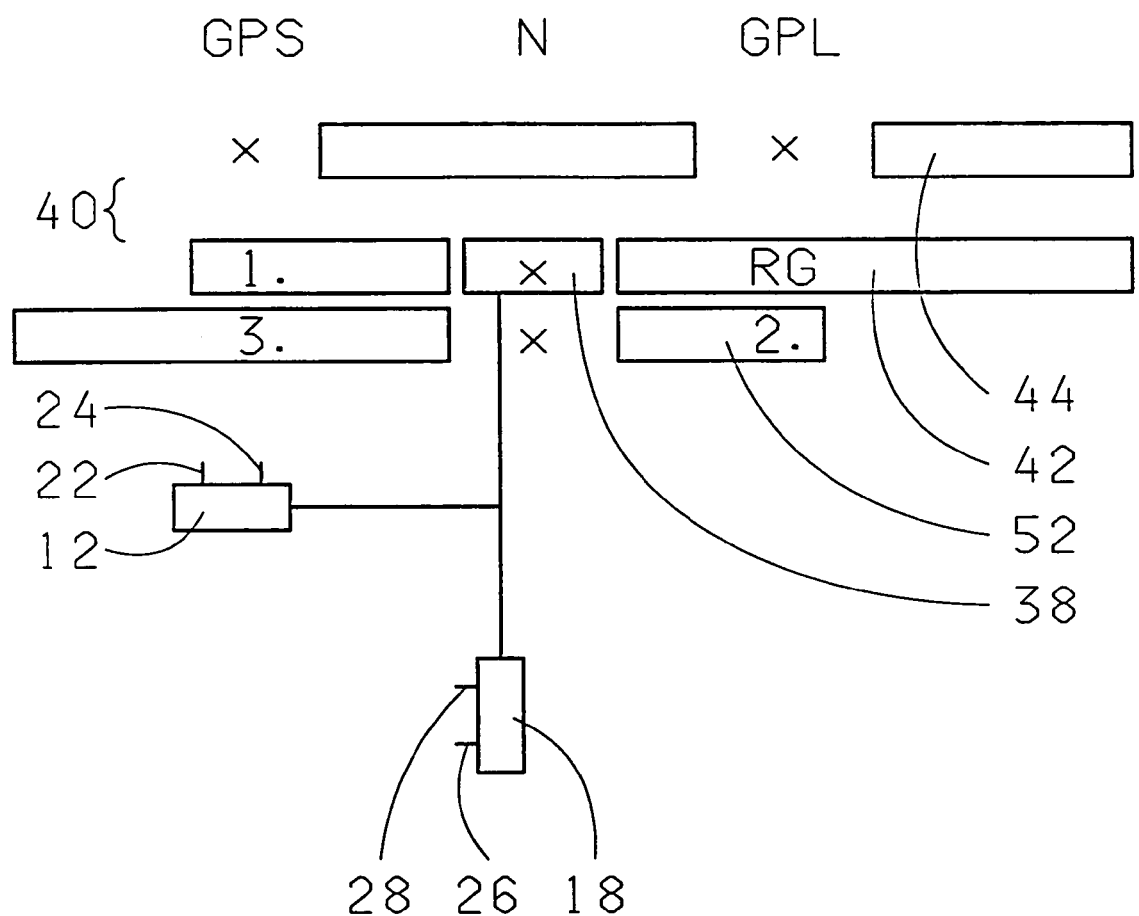
FIG. 2 is a diagrammatic view of the switching elements of a synchronized switching.

In FIG. 2, the switching sequence of a switch in the main transmission part 6 and auxiliary-section transmission part 10 is described. In this alternative, the auxiliary-section transmission part 10 is provided with one synchronizer unit. According to FIG. 1, the selector finger 38 is shown in a central position in this diagrammatic view, which it assumes when air from a central air reservoir (not shown here), abuts on the actuators 12 and 18 on all inlets 22, 24, 26 and 28 during a pneumatic switching. In a reverse switching from the fourth gear to the third gear of the vehicle transmission 4, the vehicle clutch is first opened and air abuts on the central air supply. In the vehicle transmission shown here, three forward gears and one reverse gear are provided in the main transmission part 6 so that the first three forward gears are conducted with the slow position GPL of the auxiliary-section transmission part 10 and the fourth forward gear corresponds to the position of the first forward gear in the main transmission part 6 with the quick position GPS of the auxiliary-section transmission part 10.

The selector rod 44 is shown here in the slow position GPL of the auxiliary-section transmission part 10.

In the position for the fourth gear as initial position for the reverse switching to be described next, the selector finger 38 is in the area of the selector rod 42 in a position offset to the left relative to the position shown in FIG. 2 so that the selector rod 42 has engaged the first gear in the main transmission part 6. To that end, the connecting line 24 is aerated on the actuator 12. The connecting lines 26 and 28 are simultaneously aerated on the actuator 18 in order to hold the selector finger in this position corresponding to the arrow direction 20. The connecting line 22 is additionally aerated whereby the selector finger 38 assumes the position shown in FIG. 2, and is in neutral position. Thereupon the vehicle clutch is closed. By de-aerating the connecting line 28 in the drawing plane of FIG. 2, the selector finger 38 is moved upward until it cannot continue its way in this direction since it strikes against the selector rod 44. By additional de-aeration of the connecting line 22 that follows in the drawing plane of FIG. 4, the selector finger 38 moves to the left in the clearance 40 between the selector rod 44 and the selector rod 42 until, in the position GPS, the movement of the selector finger in direction to the aperture being maintained by the actuator 18 can engage in an aperture in the selector rod 44, and the obstacle to continuation of the upward movement of the selector finger 38 in the drawing plane is eliminated when the aperture is reached. Thereupon the connecting line 22 is again aerated and the selector finger 38 moves the selector rod 44 first until reaching the position N. The connecting line 24 is then de-aerated and the selector finger moves the selector rod 38 fully until reaching the position GPL. The auxiliary-section transmission part is thus switched to the slow ratio position while the main transmission part 6 is in the neutral position from now on. The path between the positions GPS and GPL to be covered for the selector finger corresponds to the path which the selector finger has to cover in one of the selector rods 42 and 52 between the two respectively introduced switching positions. The removal from the neutral position of an engaged switching position on the selector rods 42 and 52 thus corresponds to the removal from the neutral position N of the engaged switching position GPS or GPL on the selector rod 44. For the final switching in the main transmission part 6, the connecting line 22 is now de-aerated in order to prevent movement of the selector finger 38 and a locking in the first place. The added aeration of the connecting line 28 results in that the selector finger 38 is downwardly moved in the drawing plane of FIG. 2 until it cannot continue on its way in this direction for its strikes against the selector rod 42. By an aeration of the connecting lines 22 and 24 that follows in the drawing plane of FIG. 2, the selector finger 38 moves to the left until it can engage in the aperture in the selector rod 42 in the position N; the movement of the selector finger in direction to this aperture being maintained by the actuator 18 and the obstacle to continuation of the downward movement of the selector finger 38 in the drawing plane is eliminated when reaching the aperture. The connecting line 26 is de-aerated whereby the selector finger 38 can engage in the aperture in the selector rod 52. In this position, the selector finger 38 remains first until the engine rotational speed required for switching in the main transmission part 6 has been reached. As soon as the desired rotational speed has been reached, the connecting line 22 is first also de-aerated and, in the drawing plane of FIG. 2, the selector finger 38 moves the selector rod 52 to the left whereby the third gear is engaged. Finally, the central air supply is switched off.

Likewise with the aid of FIG. 2, the switching sequence of one other switching in the main transmission part 6 and auxiliary-section transmission part 10 is now described. In this alternative, the auxiliary-section transmission part 10 is also provided with one synchronization unit. In an upshift from the third gear to the fourth gear of the vehicle transmission 4, the vehicle clutch is first opened and air abuts on the central air supply. As already mentioned in the vehicle transmission shown here, three forward gears and one reverse gear in the main transmission part 6 are provided so that the first forward gears are conducted with the slow position GPL of the auxiliary-section transmission part 10 and the fourth forward gear corresponds to the quick position GPS of the auxiliary-section transmission part 10. In the position for the third gear as an initial position for the upshift to be now described, the selector finger 38 is in the area of the selector rod 52 in a position offset to the left and downward compared to the position shown in FIG. 2 so that the selector rod 52 has engaged the third gear in the main transmission part 6. To that end, the connecting line 24 is aerated on the actuator 12. The connecting line 28 is also aerated on the actuator 18. The connecting line 22 is then additionally aerated whereby the selector finger 38 assumes first a position downwardly offset relative to the position shown in FIG. 2 and is in neutral position. Thereupon the vehicle clutch is closed. By de-aerating the connecting line 28 and aerating the connecting line 26, the selector finger 38 is downwardly moved in the drawing plane of FIG. 2 until it cannot proceed on its way in this direction, since it strikes against the selector rod 44. By virtue of the further aeration that follows of the connecting line 24, the selector finger 38, in the drawing plane of FIG. 2, moves to the right in the clearance 40 between the selector rod 44 and the selector rod 42 until it can engage in the position GPL in an aperture in the selector rod 44; the movement of the selector finger in direction to this aperture being maintained by the actuator 18 and the obstacle to continuation of the upward movement of the selector finger 38 in the drawing plane being removed again when the aperture is reached. Thereupon the connecting line 24 is again aerated and the selector finger 38 moves the selector rod 44 first until reaching the position N. The connecting line 22 is then de-aerated and the selector finger 38 moves the entire selector rod 44 until reaching the position GPS. The auxiliary-section transmission part 10 is thus switched to the high ratio position while the main transmission part 6 is still in the neutral position. For final switching in the main transmission part 6, the connecting lines 22 and 24 are now de-aerated in order first to prevent a movement of the selector finger 38 and a locking. The added aeration of the connecting line 28 results in that the selector finger 38 is downwardly moved in the drawing plane of FIG. 2 until it cannot pursue its way in this direction, since it strikes against the selector rod 42. By an aeration that follows of the connecting lines 22 and 24, the selector finger 38 moves to the right in the clearance 40 in the drawing plane of FIG. 2, until it can engage in the position N in the aperture in the selector rod 42; the movement of the selector finger in direction to the aperture is maintained by the actuator 18 and the obstacle to continuation of the downward movement of the selector finger 38 in the drawing plane when reaching the aperture being eliminated. In this position, the selector finger 38 remains first until the engine rotational speed required for switching in the main transmission part 6 is reached. As soon as the desired rotational speed is reached, the connecting line 22 is de-aerated and the selector finger 38 moves the selector rod 42 to the left in the drawing plane of FIG. 2 whereby the fourth gear is engaged as first gear in the main transmission part 6.

In the two switching operations so far described, the auxiliary-section transmission part 10 is reversed while the main transmission part 6 is in neutral, i.e., no gear is engaged in the main transmission part 6 while the engine of the vehicle is adjusted to the relevant connecting rotational speed. The switching in the main transmission part 6 is then carried out as the last part of the entire switching. When a dog clutch engagement is used in the auxiliary-section transmission part 10, the rotational speed for switching in the auxiliary-section transmission part 10 is adjusted by synchronization of the engine. Therefore in this case, the switching in the auxiliary-section transmission part 10 in this case has to be carried out as the last switching and the switching in the main transmission part 6 is already finished. In order that the clearance 40 for movement of the selector finger 38 can also be reached while the selector rod 42 is in a switching position, the gears of the main transmission part 6, which are switched by the selector rod 42 in this alternative, have to include the lowest and the highest ratios of the main transmission part 6. Only then can the selector rod 44 be pulled away from the switching position with the selector finger for adjusting the auxiliary-section transmission part 10 and be reversed from the highest gear of the slow ratio of the auxiliary-section transmission part 10 to the lowest gear of the quick ratio of the auxiliary-section transmission part 10 and vice versa.

Figure 3:
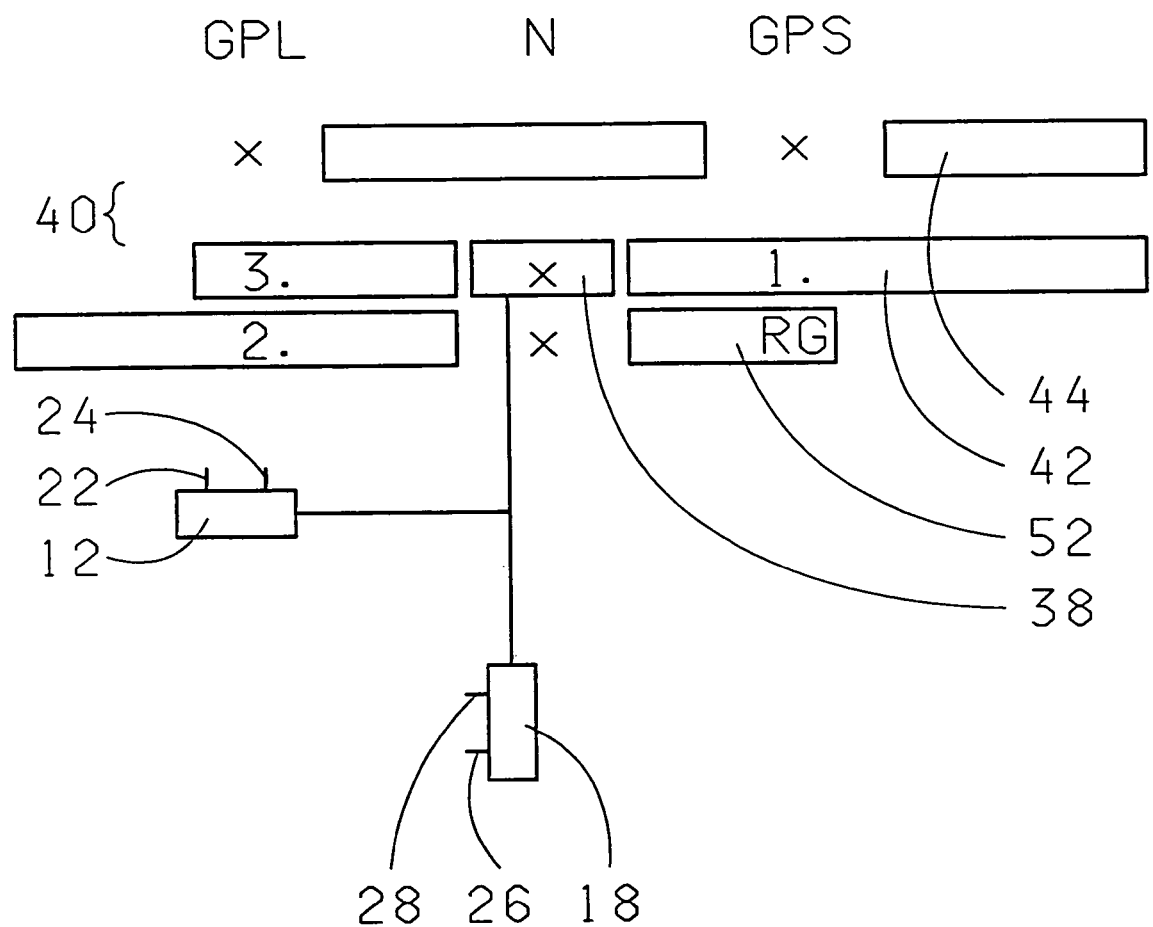
FIG. 3 is a diagrammatic view of the switching elements of a dog clutch engagement.

In FIG. 3, the first and the third gear of the main transmission part 6 are located on the selector rod 42 while the second gear and the reverse gear are located on the selector rod 52. With the aid of FIG. 3 is described the sequence of a switching in the main transmission part 6 and auxiliary-section transmission part 10. In this alternative, the auxiliary-section transmission part 10 is provided with a dog clutch engagement. According to FIG. 1, the selector finger 38 is shown in a central position in this diagrammatic graph, which is assumed (shown here) abuts on the actuators 12 and 18 on all inlets 22, 24, 26 and 28 during a pneumatic switching.

The selector rod 44 is shown here in the quick position GPS of the auxiliary-section transmission. This is reversed from the position in FIG. 2, but serves to optimize the switching sequence. The positions of the selector rods have to be arranged differently depending on the structure of the auxiliary-section transmission. In an arrangement of the positions according to FIG. 2, the switching sequence, described below, has to be accordingly adapted.

In a reverse switch from the fourth gear to the third gear of the vehicle transmission 4, the clutch is first opened and air abuts on the central air supply. As already shown, relative to the other alternative, in the main transmission part 6 of the vehicle transmission (shown here), three forward gears and one reverse gear are provided so that the first three forward gears are conducted with the slow position GPL of the auxiliary-section transmission part 10 and the fourth forward gear corresponds to the position of the first forward gear in the main transmission part 6 combined with the quick position GPS of the auxiliary-section transmission part 10. In the position for the fourth gear as initial position for the reverse switch to be next described, the selector finger 38 is in the area of the selector rod 42 in a position offset to the right contrary to the position, shown in FIG. 3, 50 that the selector rod 42 has engaged the first gear in the main transmission part 6. To that end, the connecting line 22 is aerated on the actuator 12. The connecting lines 26 and 28 are also simultaneously aerated on the actuator 18 in order to keep the selector finger 38 in this position 4. accord to the arrow directions 20. The connecting line 22 is then de-aerated. Due to the de-aeration of the connecting line 28 in the drawing plane of FIG. 3, the selector finger 38 is moved upward until it can engage in the aperture in the selector rod 44 in the position GPS. Thereupon the connecting lines 22 and 24 are again aerated and the selector finger 38 moves the selector rod 44 until reaching the position N. The auxiliary-section transmission part 10 is thus 4. switched to the neutral position while the main transmission part 6 remains in the first gear. The connecting lines 22 and 24 are de-aerated. By additional aeration of the connecting line 28, the selector finger 38 moves downwards in the drawing plane of FIG. 3 until it cannot continue on its way in this direction, since it strikes against the selector rod 42. By an additional aeration that follows of the connecting line 22 in the drawing plane of FIG. 3, the selector finger 38 moves to the right the clearance 40 between the selector rod 44 and the selector rod 42 until it can engage in the position for the first gear in the aperture in the selector rod 42; the movement of the selector finger 38 in direction to the aperture being maintained by the actuator 18 and the obstacle to continuing the downward movement of the selector finger 38 in the drawing plane when reaching the aperture being eliminated. After reaching the rotational speed needed for switching the main transmission part 6, the connecting line 22 is de-aerated and the connecting line 24 aerated and, in the drawing plane, the selector rod 42 switches to the left until the switching position for the third gear is reached in the main transmission part 6. Thereupon the vehicle clutch is closed. For final switching in the auxiliary-section transmission part 10, the connecting lines 22 and 24 are now de-aerated in order to prevent movement of the selector finger 38 in the first place. By de-aeration of the connecting line 28, the selector finger 38 is moved upward in the drawing plane of FIG. 3 until it cannot continue on its way in this direction for having stricken against the selector rod 44. By simultaneous aeration that follows of the connecting lines 22 and 24, the selector finger 38, in the drawing plane of FIG. 3, moves to the right in the clearance 40 between the selector rod 44 and the selector rod 42 until it can engage in the position N in the aperture in the selector rod 44; the movement of the selector finger 38 in direction to this aperture being maintained by the actuator 18 and the obstacle to continuation of the upward movement of the selector finger 38 in the drawing plane being eliminated when the aperture is reached. The selector finger 38 remains in this position first until reaching the engine rotational speed required for switching in the auxiliary-section transmission part 10. As soon as the desired rotational speed has been reached, the connecting line 22 is de-aerated and the selector finger 38 moves the selector rod 44 until the position GPL is reached. The connecting line 24 is de-aerated. The additional aeration of the connecting line 28 results in that the selector finger 38 is moved downwards in the drawing plane of FIG. 3 until, in the position of the switched third gear of the main transmission part 6, it can engage in the aperture in the selector rod 42. Finally the central air supply is switched off.

The switching sequence of another switching in the main transmission part 6 and auxiliary-section transmission part 10 is now described, likewise with reference to FIG. 3. In this alternative, the auxiliary-section transmission part 10 is also provided with a dog clutch engagement. In an upshift from the third gear to the fourth gear of the vehicle transmission 4, the clutch is first opened and air abuts on the central air supply. In the position for the third gear as starting position for the upshift to be described, the selector finger 38 is in the area of the selector rod 42 in a position offset to the left, unlike the position shown in FIG. 3, so that the selector rod 42 has engaged the third gear in the main transmission part 6. For the purpose, the connecting line 24 on the actuator 12 is aerated. The connecting lines 26 and 28 on the actuator 18 are also simultaneously aerated in order to keep the selector finger 38 in this position, according to the arrow direction 20. The connecting line 24 is additionally de-aerated. By the de-aeration of the connecting line 28, the selector finger 38 is moved upwards in the drawing plane of FIG. 3 until it can engage in the position GPL in an aperture in the selector rod 44. Thereupon the connecting lines 22 and 24 are again aerated and the selector finger 38 moves the selector rod 44 until reaching the position N. The auxiliary-section transmission part 10 is thus switched to the neutral position while the main transmission part 6 remains in the position for the third gear. The connecting lines 22 and 24 are de-aerated. By additional aeration of the connecting line 28, the selector finger 38 moves downwardly in the drawing plane of FIG. 3 until it cannot proceed on its way in this direction by striking against the selector rod 42. By an additional aeration that follows of the connecting line 24 in the drawing plane of FIG. 3, the selector finger 38 moves to the left in the clearance 40 between the selector rod 44 and the selector rod 42 until it can engage in the position for the third gear in the aperture in the selector rod 42, the movement of the selector finger 38 in direction to the aperture being maintained by the actuator 18 and the obstacle to the continuation of the downward movement of the selector finger 38 in the drawing plane being eliminated. After reaching the rotational speed needed for switching in the main transmission part 6, the connecting line 24 is de-aerated and the connecting line 22 aerated and the selector rod 42, in the drawing plane, switches to the right until reaching the switching position for the first gear in the main transmission part 6. Thereupon the vehicle clutch is closed. For the final switching in the auxiliary-section transmission part 10, the connecting lines 22 and 24 are now de-aerated in order next to prevent a movement of the selector finger 38. By de-aerating the connecting line 28, the selector finger 38 is moved upwards in the drawing plane of FIG. 3 until it cannot continue on its way in this direction since it strikes against the selector rod 44. By a simultaneous aeration that follows of the connecting lines 22 and 24, the selector finger 38, in the drawing plane of FIG. 3, moves to the left in the clearance 40 between the selector rod 44 and the selector rod 42 until, in the position N, it can engage in the aperture in the selector rod 44, the movement of the selector finger in direction to the aperture is maintained by the actuator 18 and the obstacle to continuation, in the drawing plane, of the upward movement of the selector finger 38 until reaching the aperture being eliminated. In this position, the selector finger 38 remains mainly until reaching the engine rotational speed required for switching in the auxiliary-section transmission part 10. As soon as the desired rotational speed has been reached, the connecting line 24 is de-aerated and the selector finger 38 moves the selector rod 44 until reaching the position GPS. The connecting line 22 is de-aerated. The additional aeration of the connecting line 28 results in that the selector finger 38, in the drawing plane of FIG. 3, is moved downwards until it can engage in the position of the switched first gear of the main transmission part 6 in the aperture in the selector rod 42. The central air supply is finally switched off.

By the design described, it is possible for switching the auxiliary-section transmission part 10 to eliminate a separate actuator with appertaining control and control valves, the same as the mechanical transmission needed between this actuator and the selector fork in the auxiliary-section transmission part 10. This operates with special advantage when a transmission originally laid out for four gear steps in the main transmission part 6 drops one of the gear steps whereby a selector rod can be eliminated. Thereby the number of gears of the vehicle transmission is certainly reduced but, in the switching expenses, can thereby be saved.

REFERENCE NUMERALS 2 switching device
4 vehicle transmission
6 main transmission part
8 splitter transmission part
10 auxiliary-section transmission part
12 actuator
14 selector shaft
16 arrow direction
18 actuator
20 arrow direction
22 connecting line
24 connecting line 26 connecting line
28 connecting line
30 selector fork
32 selector rod
34 actuator
36 arrow direction
37 control device
38 selector finger
40 clearance
42 selector rod
44 selector rod
46 selector fork
50 selector fork
52 selector rod
54 selector fork

The invention claimed is:

1. A switching device (2) for a multi-step vehicle transmission (4) having one main transmission part (6) and at least one auxiliary-section transmission part (10) and comprising switching means (12, 14, 18, 38) for actuating switching elements (42, 50, 52, 54) in the main transmission part (6) and switching means (12, 14, 18, 38) for actuating switching elements (44, 46) in the auxiliary-section transmission part (10) and in which the switching means (12,14, 18, 38) for actuating the switching elements (42, 50, 52, 54) in the main transmission part (6) also actuate the switching elements (44, 46) in the auxiliary-section transmission part (10), the switching means (12,14, 18, 38) have a clearance (40) in which can be moved one element (38) of the switching means that actuates the switching elements (42, 44, 46, 50, 52, 54) during a selection process for choosing a desired switching element (42, 44, 46, 50, 52, 54) in direction to a switching operation.

2. The switching device (2) according to claim 1, wherein the switching means (12,14,18, 38) for actuating the switching elements (42, 50, 52, 54) in the main transmission part (6) comprise one of a pneumatic, hydraulic or electric actuator (12) for carrying out a switching command.

3. The switching device (2) according to claim 2, wherein the actuator (12, 18) is controlled by automation based on commands processed in a control device (37) according to preset rules.

4. The switching device (2) according to claim 2, wherein the actuator (12) for carrying out the switching command can be controlled with at least parts of a selection command for carrying out a selection procedure in direction of the switching operation.

5. The switching device (2) according to claim 2, wherein the switching elements (44, 46) of the auxiliary-section transmission part (10) are synchronized switching elements.

6. The switching device (2) according to claim 2, wherein the switching elements (44, 46) of the auxiliary-section transmission part (10) comprise one dog clutch engagement without synchronization elements.

7. The switching device (2) according to claim 6, wherein in the presence of a dog clutch engagement without synchronization elements, the switching elements (42) of the main transmission part (6) located next to the clearance (40) are switching elements for a highest and a lowest ratio step of the main transmission part (6).

8. The switching device (2) according to claim 2, wherein the switching means (12,14,18, 38) for actuating the switching elements (42, 50, 52, 54) in the main transmission part (6) comprise one single selector shaft (14).

9. The switching device (2) according to claim 2, wherein a selector finger (38) is directly connected with the switching means (12, 18) for carrying out a switching motion and a selection motion.

10. The switching device (2) according to claim 1, wherein the switching means (12,14,18, 38) for actuating the switching elements (42, 50, 52, 54) in the main transmission part (6) comprise one of a pneumatic, hydraulic or electric actuator (18) for carrying out a selection command.

11. The switching device (2) according to claim 1, wherein on the clearance (40), a first switching element (44) of the auxiliary-section transmission part (10) abuts on one side and a second switching element (42) of the main transmission part (6) abuts on another side.

* * * * *